(12) United States Patent
Dhoolia et al.

(10) Patent No.: US 9,122,561 B2
(45) Date of Patent: Sep. 1, 2015

(54) PROGRAM INTEGRATION THAT ACCOMMODATES RESTRICTIONS ON MERGE-LOCATIONS

(71) Applicant: International Business Machines Corporation, Armonk, NY (US)

(72) Inventors: Pankaj Dhoolia, Bangalore (IN); Diptikalyan Saha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 14/035,069

(22) Filed: Sep. 24, 2013

(65) Prior Publication Data

US 2015/0089476 A1   Mar. 26, 2015

(51) Int. Cl.
*G06F 9/44* (2006.01)

(52) U.S. Cl.
CPC ... *G06F 8/71* (2013.01); *G06F 8/72* (2013.01)

(58) Field of Classification Search
CPC ......................................................... G06F 8/68
USPC ......................................................... 717/122
See application file for complete search history.

(56) References Cited

U.S. PATENT DOCUMENTS

| | | | |
|---|---|---|---|
| 6,748,584 B1 * | 6/2004 | Witchel et al. | 717/136 |
| 7,131,112 B1 * | 10/2006 | Bartz et al. | 717/122 |
| 7,703,027 B2 * | 4/2010 | Hsu et al. | 715/763 |
| 8,042,097 B2 * | 10/2011 | Aridor et al. | 717/122 |
| 8,402,547 B2 | 3/2013 | Wiegenstein et al. | |
| 2004/0230964 A1 * | 11/2004 | Waugh et al. | 717/168 |
| 2009/0007087 A1 * | 1/2009 | Ito et al. | 717/156 |
| 2009/0064090 A1 * | 3/2009 | Anonsen et al. | 717/104 |
| 2009/0328067 A1 | 12/2009 | Srinivasan et al. | |
| 2012/0072988 A1 * | 3/2012 | Agrawal | 726/24 |
| 2012/0159434 A1 * | 6/2012 | Dang et al. | 717/120 |

OTHER PUBLICATIONS

Binkley et al., Program Integration for Languages with Procedure Calls, ACM (1995) retrieved from http://delivery.acm.org/10.1145/210000/201056/p3-binkley.pdf?ip=151.207.250.61&id=201056&acc-ACTIVE%20SERVICE&key=C15944E53D0ACA63%2E4-D4702B0C3E38B35%2E4D4702B0C3E38B35%2E4D4702B0C3-E38B35&CFID=468274684&CFTOKEN=47088933&_ACM_=1419877565_8402903ffb1d7.*

Apiwattanapong, T. Identifying Testing Requirements for Modified Software, Aug. 2007.

(Continued)

*Primary Examiner* — Don Wong
*Assistant Examiner* — Theodore Herbert
(74) *Attorney, Agent, or Firm* — Ryan, Mason & Lewis, LLP (57) ABSTRACT

Methods, systems, and articles of manufacture for program integration are provided herein. A method includes identifying each varying portion of a customized version of a program as compared to a standard version of the program; identifying each common portion of the customized version as compared to the standard version; merging the customized version with the standard version to create a merged version of the program based on the identified common portions and the identified varying portions such that semantics of both the customized version and the standard version are preserved in the merged program; associating each change contributed by the customized version, represented by the varying portions in the merged version, to a defined extension point in the merged version; and generating a program extension for the standard version for each span of the program contained in a defined extension point span in the merged version.

18 Claims, 7 Drawing Sheets

(56) References Cited

OTHER PUBLICATIONS

Gomez, Supporting Integration Activities in Object-Oriented Applications, Oct. 2012.
Tip F. A Survey of Program Slicing Techniques, 1994.
Horwitz et al., Integrating Noninterfering Versions of Programs, ACM Transactions on Programming Languages and Systems (TOPLAS), 11(3), 345-387. (1989).
Horwitz et al., Interprocedural Slicing using Dependence Graphs, ACM Transactions on Programming Languages and Systems (TOPLAS), 12(1), 26-60. (1990).
Yang et al., A Program Integration Algorithm that Accommodates Semantics-Preserving Transformations, ACM Transactions on Software Engineering and Methodology (TOSEM), 1(3), 310-354. (1992).

* cited by examiner

| CUSTOM CLONE - C | BASE STANDARD PROGRAM - S1 | STANDARD PROGRAM UPGRADED - S2 |
|---|---|---|
| Input:<br>    mode as String,<br>    cust_ids as list,<br>    inv_nums as list,<br>    po_nums as list.<br><br>... .. .<br>select from blocked_inv into blk_inv<br>    custid in cust_ids AND<br>    invnum in inv_nums AND<br>    ponum in po_nums.<br><br>if sy-subrc NE 0.<br>    Exit.<br>end-if<br>... .. .<br>perform blk_reason_chk tables blk_inv.<br>perform prepare_display tables blk_inv.<br>perform add_new_fields tables blk_inv.<br>perform notify_user using c_user.<br><br>    call function grid_display<br>        exporting t_output =<br>    blk_inv. | Input:<br>    mode as String,<br>    cust_ids as list,<br>    inv_nums as list.<br><br>... .. .<br>start -of-selection.<br>Extension-point begin @name=selection.<br>    select from blocked_inv into blk_inv<br>        custid in cust_ids AND<br>        invnum in inv_nums.<br>Extension-point end.<br>if sy-subrc NE 0.<br>    Exit.<br>end-if<br>... .. .<br>perform blk_reason_chk tables blk_inv.<br>perform prepare_display tables blk_inv.<br>perform notify_user using c_user.<br><br>Extension-point begin @name=output.<br>    call function grid_display<br>        exporting t_output =<br>    blk_inv.<br>Extension-point end. | Input:<br>    mode as String,<br>    cust_ids as list,<br>    inv_nums as list.<br>Extension-point begin @name=input.<br>Extension-point end.<br>... .. .<br>start -of-selection.<br>Extension-point begin @name=selection.<br>    select from blocked_inv into<br>    blk_inv    custid in cust_ids AND<br>        invnum in inv_nums.<br>Extension-point end.<br>if sy-subrc NE 0.<br>    Exit.<br>end-if<br>... .. .<br>perform blk_reason_chk tables blk_inv.<br>perform prepare_display tables blk_inv.<br>perform notify_user using c_user.<br>perform audit using blk_inv.<br>Extension-point begin @name=output.<br>    call function grid_display<br>        exporting t_output =<br>    blk_inv.<br>Extension-point end. |

```
// Worklist algorithms
∀ v ∈ P
        if v ∈ Vnew
                Add follow(v) to P
        else
                ∀ f ∈ follow(v)
                        if f ∉ P
                                if ∄ valuePreservingPath(v → f, G', G)
                                        Add f to P
```

PROGRAM INTEGRATION THAT ACCOMMODATES RESTRICTIONS ON MERGE-LOCATIONS

FIELD OF THE INVENTION

Embodiments of the invention generally relate to information technology (IT), and, more particularly, to customization and standardization techniques.

BACKGROUND

Enterprise resource planning (ERP) vendors provide standard packaged applications to cater to the IT needs of an enterprise. Enterprises often customize standard application components of such applications to meet industry- and/or enterprise-specific needs. However, customizations of standard application components introduce complexity into ERP systems and increase maintenance costs. Also, to facilitate customizations, ERP vendors commonly include extension frameworks in their platforms. Gaps in technology, however, make identifying similar custom codes and merging the similar custom codes back to standard application components as extensions challenging.

Additionally, ERP vendors that attempt to upgrade standard application packages to cover more industry-specific needs of enterprises face challenges in identifying standard upgrades that may be used to replace existing custom processing. Similarly, enterprises attempting to consolidate ERP systems due to cost and other market factors also face challenges in accounting for customizations to standard application packages.

Existing approaches for application customization are limited to code clone identification via approximate methods, and such approaches do not address the problem of automatic program integration to move custom code back to standard code.

SUMMARY

In one aspect of the present invention, techniques for program integration that accommodate restrictions on merge-locations are provided. An exemplary computer-implemented method can include steps of identifying each of one or more varying portions of a customized version of a program as compared to a standard version of the program; identifying each of one or more common portions of the customized version of the program as compared to the standard version of the program; merging the customized version of the program with the standard version of the program to create a merged version of the program based on the one or more identified common portions and the one or more identified varying portions such that semantics of both the customized version of the program and the standard version of the program are preserved in the merged program; associating each change contributed by the customized version of the program, represented by the one or more identified varying portions in the merged version of the program, to a defined extension point in the merged version; and generating a program extension for the standard version of the program for each span of the program contained in a defined extension point span in the merged version.

In another aspect of the invention, a method includes the steps of identifying each of one or more varying portions of a second version of a given code as compared to a first version of the given code; merging the second version of the given code with the first version of the given code to create a merged version of the given code such that semantics of both the second version of the given code and the first version of the given code are preserved in the merged version of the given code; and resolving each interference created by the one or more identified varying portions in the merged version of the given code. The method also includes the steps of associating each change contributed by the second version of the given code, represented by the one or more identified varying portions in the merged version of the given code, to a defined extension point in the merged version; and generating a program extension for the first version of the given code for each span of the given code contained in a defined extension point span in the merged version of the given code.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4 is a diagram illustrating an example embodiment of the invention;

DETAILED DESCRIPTION

As described herein, an aspect of the present invention includes constrained program integration for moving customizations back to a standard format in ERP systems. At least one embodiment of the invention includes performing an equivalence analysis on an item of customized code (also referred to herein as custom code) to determine if any portion of the custom code matches any portion of standard code and/or standard code enhancements. Additionally, at least one embodiment of the invention includes performing refactoring analysis on standard modifications or custom clones to convert the customizations to standard code enhancements.

By way of illustration, various symbols are used below in the description of various aspects of the invention. For example, as used herein, S1 (or simply S) refers to the standard program base from which a custom clone, C, is created. Additionally, as used herein, S2 (or S') refers to the upgraded state of the standard program S1, Δ refers to a customization, and M refers to the merged program.

Figure 1:
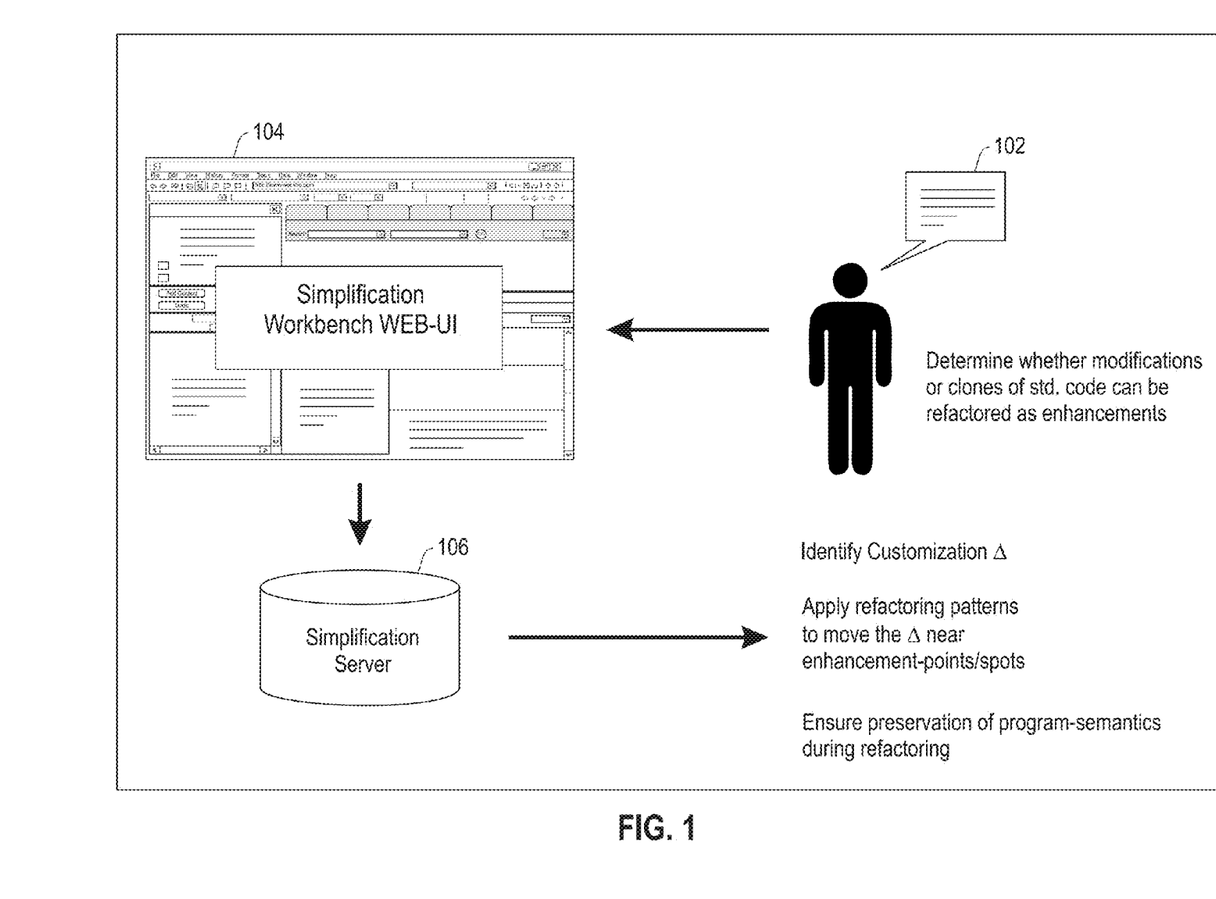
FIG. 1 is a diagram illustrating refactoring analysis, according to an embodiment of the invention.

FIG. 1 is a diagram illustrating refactoring analysis, according to an embodiment of the present invention. By way of illustration, FIG. 1 depicts a user 102 seeking a determination as to whether modifications or clones of standard code can be refactored as enhancements. Accordingly, techniques such as detailed in FIG. 1 can include the use of a workbench web user interface (UI) 104 and a simplification server 106 to identify a customization Δ, apply one or more refactoring patterns to move the Δ near to enhancement points in the code, and ensure preservation of program semantics during refactoring.

As detailed herein, a simplification workbench web UI provides an interface for refactoring analysis. The interface provides for uploading and managing the programs on which the refactoring analysis is to be performed, as well as provides a mechanism to visualize the computed refactoring. In an example embodiment of the invention, the UI presents the original code and the refactored proposal side-by-side, highlighting the customizations in the original and the corresponding proposed refactoring movements in the refactored programs. In case of multiple refactoring possibilities of equal rank, the UI permits the user to select the preferred refactoring.

In at least one embodiment of the invention, refactoring operators can be defined for advanced business application programming (ABAP) programs. By way of example, a "swap" operator swaps the location of two program statements, and a "parallelize loop" operator splits a single loop into multiple loops, with statements partitioned across those loops. Additionally, semantics preservation rules are defined for each of the refactoring operators. For example, for sequential statements [Statement$_1$, Statement$_2$], a swap of sequence to [Statement$_2$, Statement$_1$] can be semantics-preserving. As also noted above in connection with FIG. 1, in at least one embodiment of the invention, refactoring operators are repeatedly applied to move the customization (Δ) to a nearby enhancement point in the code.

In accordance with one or more embodiments of the invention, a customization is moved automatically. By way of illustration, the first step of refactoring analysis is to find enhancement points and the Δ (that is, code added in the customization). A predefined set of refactoring rules can be utilized, wherein each rule includes three parts: a pre-pattern part, a post-pattern part, and a pre-condition part. If the pre-condition is satisfied, a code instance matching with the pre-pattern can change to a code instance matching with the post-pattern without losing any semantics. The refactoring algorithm iteratively applies refactoring rules where the pre-pattern matches with a code instance containing Δ, such that in post-pattern, the Δ moves towards the enhancement points.

Figure 2:
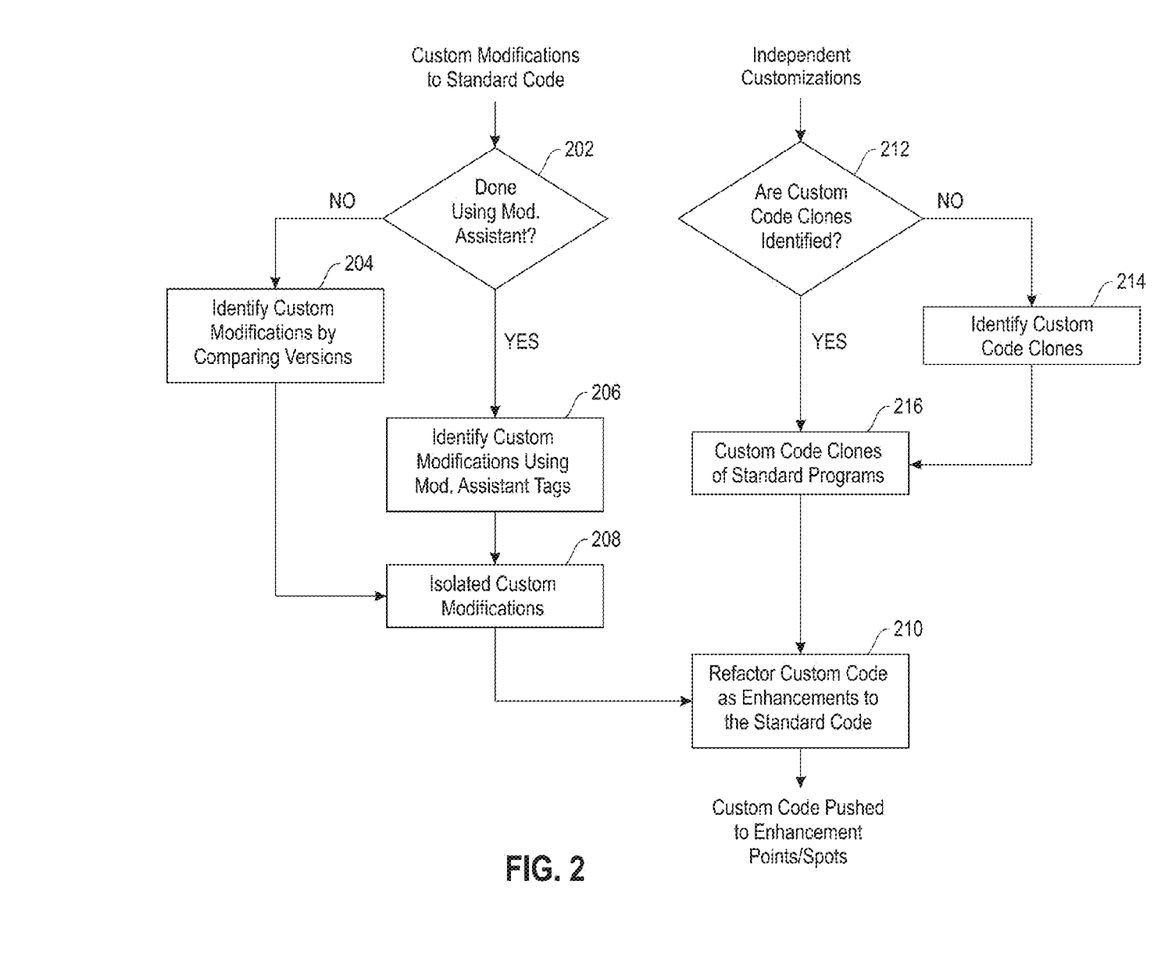
FIG. 2 is a flow diagram illustrating refactoring analysis techniques according to an embodiment of the invention.

FIG. 2 is a flow diagram illustrating refactoring analysis techniques according to an embodiment of the invention. In one aspect of the techniques depicted in FIG. 2, custom modifications are made to standard code. In such an aspect, step 202 includes determining whether a modification assistant is to be used for the modifications. Instead of directly modifying a standard code, a modification assistant can be used to modify the standard code. A modification assistant keeps track of where the modifications are performed with the help of tags, inside of which the modifications are placed. This aids in managing modifications.

Referring back to FIG. 2, if the modification assistant is to be used, step 206 includes identifying custom modifications using modification assistant tags. If the modification assistant is not to be used, step 204 includes identifying custom modifications by comparing versions of the code. In either event, the subsequent step, step 208, includes identifying the isolated customer modifications. Further, step 210 includes refactoring the custom code as enhancements to the standard code, whereby the custom code is pushed to the enhancement points in the standard code.

In another aspect of the techniques depicted in FIG. 2, independent modifications are made. In such an aspect, step 212 includes determining whether custom code clones have been identified. In packaged ERP systems, certain standard functionalities are already available to the user. These standard functionalities are implemented by standard code. However, in many occasions, a user may want different functionality than the standard functionality. If a slight variation of the standard functionality is desired, the user can create a custom code which is a clone (or copy) of the standard code. This new code is referred to herein as a custom code clone. The additional functionalities are typically implemented by changing the custom code clone.

Referring back to FIG. 2, if custom code clones are to be used, step 216 includes obtaining the custom code clones of the standard programs. If custom code clones are not to be used, step 214 includes identifying custom code clones (prior to obtaining the custom code clones in step 216). In either event, the subsequent step, step 210, includes refactoring the custom code as enhancements to the standard code, whereby the custom code is pushed to the enhancement points in the standard code.

Figure 3:
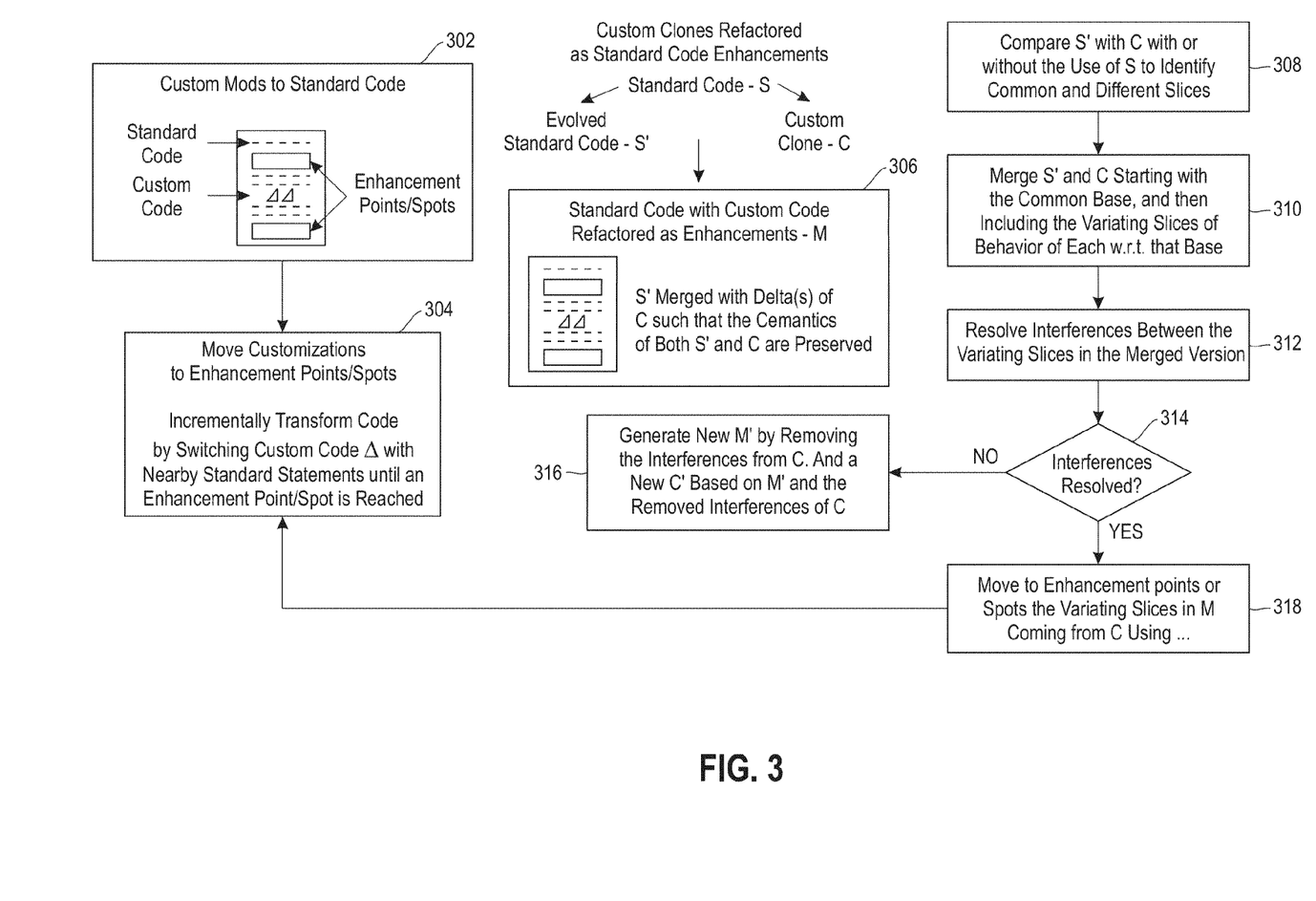
FIG. 3 is a flow diagram illustrating techniques for refactoring enhancements according to an embodiment of the invention.

FIG. 3 is a flow diagram illustrating techniques for refactoring enhancements according to an embodiment of the invention. As noted in FIG. 2, with custom modifications to standard code 302, the optimizations or customizations are moved to enhancement points in the code in step 304. The code can be incrementally transformed by switching custom code Δ with nearby standard statements until an enhancement point is reached.

With standard code with custom code refactored as enhancements (M) 306, FIG. 3 depicts various steps. For example, step 308 includes comparing the evolved or upgraded standard code S' with the custom clone C with or without the use of the standard code S to identify common and differing slices. Step 310 includes merging the evolved or upgraded standard code S' and the custom clone C starting with the common base, and then including the varying slices of behavior of each with respect to that base. Step 312 includes resolving interferences between the varying slices in the merged version, as further described herein. Also, step 314 includes determining whether the interferences have been resolved. If no (that is, the interferences have not been resolved), the sequence continues to step 316, which includes generating a new merged version M' by removing the interferences from the custom clone C and generating a new custom clone C' based on the new merged version M' and the removed interferences of C. If yes (that is, the interferences have been resolved), the sequence continues to step 318, which includes moving the varying slices in M coming from C to enhancement points via step 304.

As such, at least one embodiment of the invention includes merging custom-modifications and cloned customizations of standard code back to the standard code as extensions. Such an embodiment can include formally representing the program semantics, and differencing the representations of the custom variant and the standard program to identify a common slice, as well as the varying slices of the custom variant and the standard code with respect to that common slice. Those representations can be merged by taking a union of the common slice and the varying slices of the custom variant and the standard code. Also, as noted in FIG. 3, such an embodiment includes identifying and resolving interferences between the varying slices in the merged representation, and solving extension point constraints by associating all changes contributed by the custom variant to defined extension points in the merged representation. Further, code extensions can be generated for the spans contained in the extension point spans in the merged representation.

FIG. 4 is a diagram illustrating an example embodiment of the invention. In the example, the base standard program S1 404 supports the process for unblocking blocked invoices with a computation flow as follows:

a. Take customer identifiers (IDs) or invoice numbers as input;

b. Select the blocked invoices based on that input;

c. Check blocking reasons, removing reasons that are no longer valid, and unblock the invoices with no unblocking reasons;

d. Notify the user with the outcome; and e. Display a list of blocked invoices to the user along with related details.

As also depicted in the example in FIG. 4, a custom clone C 402 was created, as it was desired to also select the blocked invoices based on purchase order numbers. Further, it was desired that in the report view, certain additional fields would also be shown for the blocked invoices. Note also that over time, the standard program itself was updated with modifications to generate an upgrade version of the standard program S2 406. As depicted in FIG. 4, one modification was to create a new extension point in the input block, and another modification added a step to perform an audit (book-keeping activity) for the blocked invoices.

As described herein, at least one embodiment of the invention includes representing S1, S2, and C formally. Such a formal representation explicitly expresses the necessary program semantics needed for statically analyzing behavior, as well as comparing, merging, and generating a code representation for the programs. By way merely of example, a program dependence graph (PDG) is one form of representation. Accordingly, at least one embodiment of the invention can include representing database statements in the PDG. Such an embodiment can include variables such as the following:

table(s): states the table(s) from which a selection is to be made.

def(s): states the program variables which are being defined. Referring to FIG. 4, for example, in S1, S2, and C, there is a SELECT statement which can define table variable blk_inv, along with a system variable such as sy-subrc. Sy-subrc has a non-zero value if the selection statement did not find any records matching its selection criteria.

use(s): states the program variables used in the selection expression. Referring again to FIG. 4, for example, in S1 and S2, cust_ids and inv_nums are used; in C, po_nums is used as well.

expr: states the selection expression that is evaluated in defining the def(s) using the use(s) and the table(s). Referring to FIG. 4, for example, in S1 and S2, the expr is "custid in cust_ids AND invnum in inv_nums."

As also detailed herein, the affected points in S2 and C are those vertices at which a difference in the computational behavior can be observed in S2 and C with respect to S1. As used herein, a "slice" is defined with respect to a vertex as a value behavior. Additionally, it is noted that if the value behavior of a variable at a vertex can be demonstrated to be preserved under some controllable conditions, then the vertex is not an affected point. More specifically, if the slices with respect to a common point across the base (S1) and variant (S2 or C) differ, and, while keeping all of the common inputs the same, the differing slice in the variant may be reduced to the slice in the base at most by governing the value of any new inputs introduced by the variant, then the value behavior of the base is preserved. Additionally, the behavior difference can be identified as the set of directly affected points, and their non-behavior preserving follow.

Figure 5:
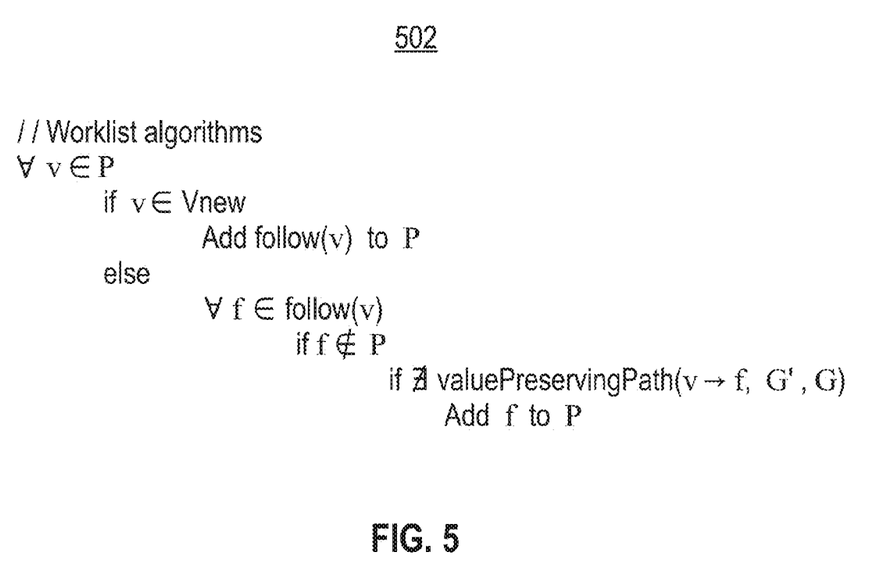
FIG. 5 is a diagram illustrating an algorithm for identifying affected points, according to an embodiment of the invention.

FIG. 5 is a diagram illustrating an algorithm 502 for identifying affected points, according to an embodiment of the invention. As used in algorithm 502, variables are represented as follows:

M=map(G, G'); for example, PDG (also represented herein as G) for variant and base;

$V_{new}$=those vertices in G which are not present in M;

$V_{mod}$=those vertices in G which are present in M but semantically different from the mapped vertices of G';

$V_{del}$=those vertices in G' which are not present in M;

$FV_{del}$=Mapped (follow($V_{del}$)); those vertices in G which are mapped to the follow of $V_{del}$; and $P=V_{new} U V_{mod} U FV_{del}$ (wherein U represents a union function).

At least one embodiment of the invention additionally includes computing affected points when a common base is not available. The output of a custom clone finding programs is typically the latest standard code (S2) and the custom clone (C). If C was created on the same system on which it has been found to be the clone, then S1 should logically correspond to the active version of the standard code at the time of the creation of C. Accordingly, the following process may be used to retrieve S1 in such a situation:

Identify the $creation-date-time for the custom-clone;

Identify the $version of the standard-program that was active at the $creation-date-time; and Retrieve the $version of the standard-program.

In ERP landscapes, however, it may often be the case that a custom clone on a system has been transported in from a different system. In such a situation, the following aspects alter the S1 retrieval:

The $creation-date-time of the custom clone on this system is the entry when the custom clone was transported (and not the entry identifying creation thereof);

This system may have been created more recently than the system from which the custom clone was transported, and hence, this system may not even have the older version from which the custom-clone was created; and Tracing back to the original system on which the custom clone was actually created may require complex traversals through the ERP system landscape.

Additionally, in such situations, the following ambiguities arise while comparing C directly with S2:

$V_{new}$—the vertices in C not mapped to S2 have the ambiguity of whether they were removed during S1 to S2, or if they have been added by C;

$V_{mod}$—the vertices in C mapped, but semantically different from S2, have the ambiguity of whether they were modified in S2 or modified in C; and $V_{del}$—the vertices in S2 that are not mapped to C have the ambiguity of whether they were dropped in C or whether they were added in S2.

As additionally detailed herein, an aspect of the invention includes a merging step. In at least one embodiment of the invention, the merge step includes creating a merged representation of a program by starting with the preserved base S1 (or the S2 when S1 is not available), and merging the affected slices from C and S2 (or just C in the absence of S1) into that preserved base. In an embodiment of the invention wherein a PDG is being used as the representation, the merge operation includes a graph merge. This can include merging the vertices of the affected slices (along with any new edges, and, recursively, their vertices). While duplicating nodes, a track of each node's origin is maintained and book-keeping is carried out to identify the merges.

Another aspect of the invention includes resolving instances of interference. If the behavior differences from C and S2 in M (that is, the merged representation) directly or indirectly conflict with each other so as to lose the individual behaviors of C and S2, the two are said to be interfering. For example, at least one embodiment of the invention includes considering changes in C and S2 to be interfering only if merging the changes from one leaves no user input governable possibility of preserving the value behavior of the changes from the other.

At least one embodiment of the invention includes identifying, labeling and resolving behavior interferences using any combination of the following:

1. If, for a vertex, there are modifications from either or both of C and S2 in M, indicating a possible vertex behavior conflict, search for solutions guided by the following rules:
   (a) If the output behavior of a vertex from S2 can be reduced to the behavior of the vertex from C based on a chain of dependencies governed by an input (such that the dependency chain from that input brings about no other change in the behavior), retain only the vertex from S2 (adding any incoming and outgoing edges of the removed vertex onto the vertex from S2).
   (b) The same reasoning may be applied in a vice-versa scenario, provided the vertex from S2 somewhere in its upward-dependency structure has an incoming extension-point-edge which will be pointing to the vertex from C.
   (c) If the above (a) and (b) scenarios do not apply (meaning that the conflict is not resolvable by retaining just one of the vertices and removing the other vertex) but the vertex from S2 somewhere in its upward-dependency structure has an incoming extension-point-edge, this implies that the change from S2 is in an enhancement region which can be modified. This presents an opportunity to artificially introduce a context and have the two alternate paths based on the context each accommodate one of the conflicting vertices.

2. For slices in M, with respect to the affected vertices from one variant, if there is a need to add new def-order edges because of the vertices coming in from the other variant, then there may be a behavior interference at the target of such def-order edges. In table-centric programming domains such as ERP systems, precise slices may be able to further provide an insight into the nature of the interference. For example, such an interference is detected wherein the operation of add_new_labels coming from C demands a new def-order dependency to be added for a call grid_display, hence introducing a behavior interference with respect S2's expectations at the call grid_display. However, a precise slicing may also reveal that the operation of add_new_labels only adds new field values to the rows of blk_inv and does not interfere with the S2's expected use of blk_inv at call grid_display.

3. Tag the conflicting interferences based on practical heuristics from the domain to allow a user to comprehend the conflicts and resolve manually (if possible). For example, such a scenario might present itself if a new value defining a statement in an upgraded standard code was interfering with a downstream use as expected by the custom clone. Accordingly, the user may wish to accept such an interference and not attempt to preserve the individual behaviors of both standard and custom clone in the merge.

4. Visualize the conflicts with a combination of textual and graphical views, illustrating suggestions, if any, and applying chosen user resolutions to the merged representation.

5. Resolving behavior interference conflicts by artificially introducing a context and conditional behavior paths based on that context, such that each conditional behavior path represents a conflicting alternative.

Additionally, as detailed herein, at least one embodiment of the invention includes solving extension point constraints. This can include, for example, searching for a solution such that all merged nodes from C in M, as well as interference resolution modifications to such nodes, either already have an incoming edge from an extension point node in M, or one can be added artificially without conflicting the order demanded by the combination of the extension-point-order-edges and the other control and flow edges.

Figure 6:
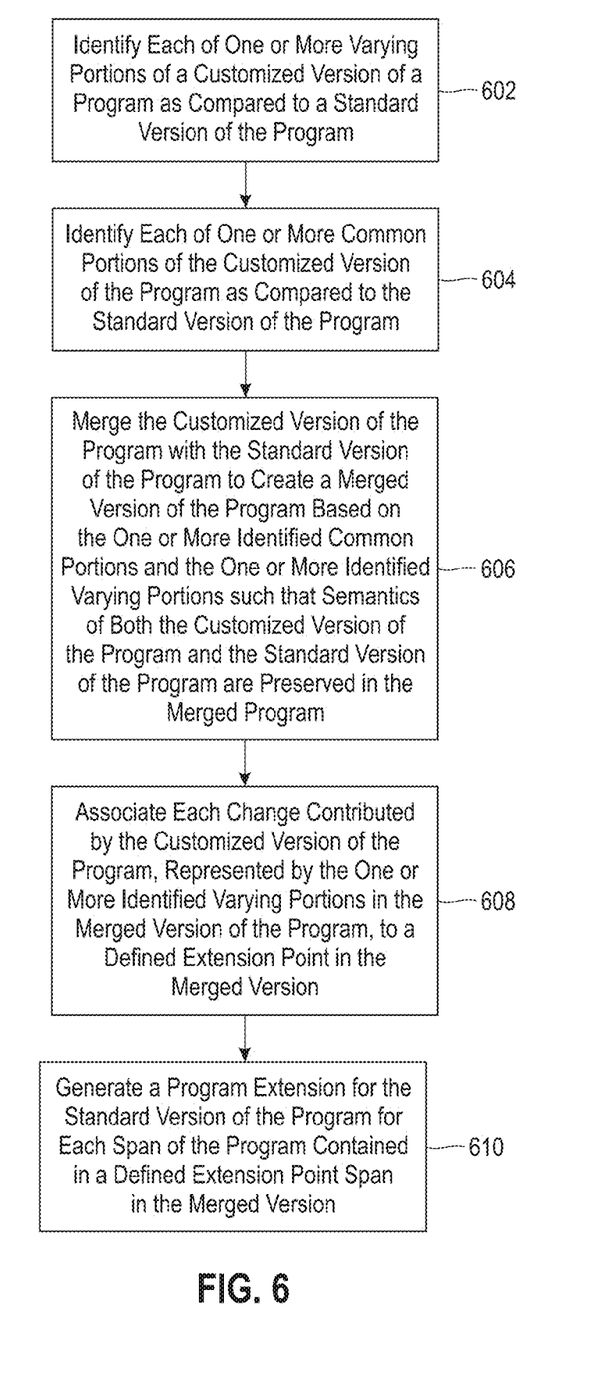
FIG. 6 is a flow diagram illustrating techniques according to an embodiment of the invention.

FIG. 6 is a flow diagram illustrating techniques according to an embodiment of the present invention. Step 602 includes identifying each of one or more varying portions of a customized version of a program as compared to a standard version of the program. As detailed herein, the standard version of the program can include a cloned version of the standard version of the program.

Step 604 includes identifying each of one or more common portions of the customized version of the program as compared to the standard version of the program. Step 606 includes merging the customized version of the program with the standard version of the program to create a merged version of the program based on the one or more identified common portions and the one or more identified varying portions such that semantics of both the customized version of the program and the standard version of the program are preserved in the merged program.

Step 608 includes associating each change contributed by the customized version of the program, represented by the one or more identified varying portions in the merged version of the program, to a defined extension point in the merged version. Step 610 includes generating a program extension for the standard version of the program for each span of the program contained in a defined extension point span in the merged version.

The techniques depicted in FIG. 6 can also include representing semantics of the standard version of the program and the customized version of the program. In at least one embodiment of the invention, such a step can include representing semantics of the standard version of the program and the customized version of the program via a PDG.

Additionally, the techniques depicted in FIG. 6 can include resolving each interference created by the one or more identified varying portions in the merged version of the program. Resolving can include identifying each of one or more behavioral differences between the standard version of the program and the customized version of the program that creates a conflict between the standard version of the program and the customized version of the program. As described herein, resolving can also include artificially introducing a context and one or more conditional behavior paths based on said context, wherein each of the one or more conditional behavior paths represents an alternative to a conflicting behavioral difference between the standard version of the program and the customized version of the program.

At least one embodiment of the invention also includes labeling each conflicting behavioral difference between the standard version of the program and the customized version of the program. Such labeling can be based, for example, on at least one heuristic. Further, at least one embodiment of the invention includes visualizing each conflicting behavioral difference between the standard version of the program and the customized version of the program with a textual view and/or a graphical view.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

As also noted herein, at least one embodiment of the invention can include identifying each of one or more varying portions of a second version of a given code as compared to a first version of the given code, and merging the second version of the given code with the first version of the given code to create a merged version of the given code such that semantics of both the second version of the given code and the first version of the given code are preserved in the merged version of the given code. Further, such an embodiment can also include resolving each interference created by the one or more identified varying portions in the merged version of the given code, associating each change contributed by the second version of the given code, represented by the one or more identified varying portions in the merged version of the given code, to a defined extension point in the merged version, and generating a program extension for the first version of the given code for each span of the given code contained in a defined extension point span in the merged version of the given code.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 7:
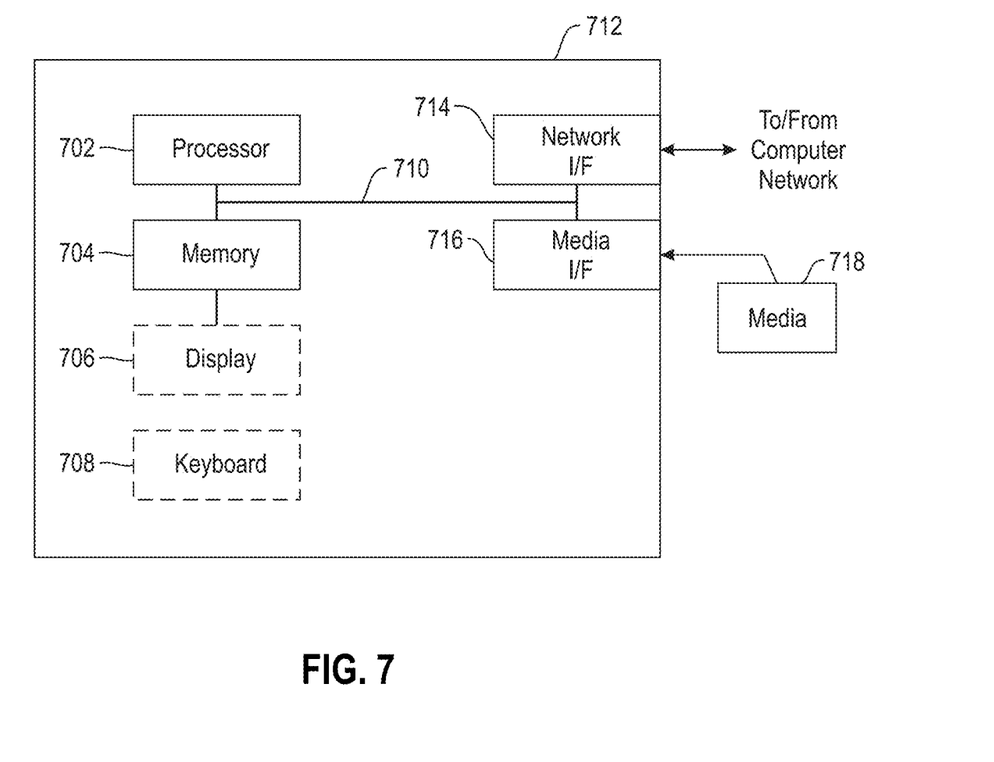
FIG. 7 is a system diagram of an exemplary computer system on which at least one embodiment of the invention can be implemented.

Additionally, an aspect of the present invention can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present to invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, enabling constrained program-integration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   identifying each of one or more varying portions of a customized version of a program as compared to a standard version of the program via a web user interface executing on an enterprise resource planning device and in communication with a server;
   identifying each of one or more common portions of the customized version of the program as compared to the standard version of the program via the web user interface executing on the enterprise resource planning device and in communication with the server;
   merging the customized version of the program with the standard version of the program to create a merged version of the program based on the one or more identified common portions and the one or more identified varying portions such that semantics of both the customized version of the program and the standard version of the program are preserved in the merged program, wherein said merging is carried out via the web user interface executing on the enterprise resource planning device;
   associating each change contributed by the customized version of the program, represented by the one or more identified varying portions in the merged version of the program, to a defined extension point in the merged version, wherein said associating is carried out via the web user interface executing on the enterprise resource planning device;
   generating a program extension for the standard version of the program for each span of the program contained in a defined extension point span in the merged version, wherein said generating is carried out via the web user interface executing on the enterprise resource planning device; and
   visualizing each of multiple conflicting behavioral differences between the standard version of the program and the customized version of the program with a combination of a textual view and a graphical view, wherein each of the multiple conflicting behavioral differences represents an instance wherein corresponding individual behaviors of the standard version of the program and the customized version of the program interfere with each other so as to render the corresponding individual behaviors precluded, wherein said visualizing is carried out via the web user interface executing on the enterprise resource planning device.

2. The method of claim 1, wherein the standard version of the program comprises a cloned version of the standard version of the program.

3. The method of claim 1, comprising:
   representing semantics of the standard version of the program and the customized version of the program.

4. The method of claim 3, wherein said representing semantics comprises representing semantics of the standard version of the program and the customized version of the program via a program dependence graph (PDG).

5. The method of claim 1, comprising:
   resolving each interference created by the one or more identified varying portions in the merged version of the program.

6. The method of claim 5, wherein said resolving comprises identifying each of one or more behavioral differences between the standard version of the program and the customized version of the program that creates a conflict between the standard version of the program and the customized version of the program.

7. The method of claim 6, comprising:
   labeling each conflicting behavioral difference between the standard version of the program and the customized version of the program.

8. The method of claim 7, wherein said labeling is based on at least one heuristic.

9. The method of claim 6, wherein said resolving comprises artificially introducing a context and one or more conditional behavior paths based on said context, wherein each of the one or more conditional behavior paths represents an alternative to a conflicting behavioral difference between the standard version of the program and the customized version of the program.

10. An article of manufacture comprising a computer readable storage medium having computer readable instructions tangibly embodied thereon which, when implemented, cause a computer to carry out a plurality of method steps comprising:
    identifying each of one or more varying portions of a customized version of a program as compared to a standard version of the program;
    identifying each of one or more common portions of the customized version of the program as compared to the standard version of the program;
    merging the customized version of the program with the standard version of the program to create a merged version of the program based on the one or more identified common portions and the one or more identified varying portions such that semantics of both the customized version of the program and the standard version of the program are preserved in the merged program;

associating each change contributed by the customized version of the program, represented by the one or more identified varying portions in the merged version of the program, to a defined extension point in the merged version; and generating a program extension for the standard version of the program for each span of the program contained in a defined extension point span in the merged version; and visualizing each of multiple conflicting behavioral differences between the standard version of the program and the customized version of the program with a combination of a textual view and a graphical view, wherein each of the multiple conflicting behavioral differences represents an instance wherein corresponding individual behaviors of the standard version of the program and the customized version of the program interfere with each other so as to render the corresponding individual behaviors precluded.

11. The article of manufacture of claim 10, wherein the method steps comprise:

resolving each interference created by the one or more identified varying portions in the merged version of the program.

12. The article of manufacture of claim 11, wherein said resolving comprises identifying each of one or more behavioral differences between the standard version of the program and the customized version of the program that creates a conflict between the standard version of the program and the customized version of the program.

13. The article of manufacture of claim 12, wherein the method steps comprise:

labeling each conflicting behavioral difference between the standard version of the program and the customized version of the program.

14. The article of manufacture of claim 12, wherein said resolving comprises artificially introducing a context and one or more conditional behavior paths based on said context, wherein each of the one or more conditional behavior paths represents an alternative to a conflicting behavioral difference between the standard version of the program and the customized version of the program.

15. The article of manufacture of claim 10, wherein the standard version of the program comprises a cloned version of the standard version of the program.

16. The article of manufacture of claim 10, wherein the method steps comprise:

representing semantics of the standard version of the program and the customized version of the program.

17. A system comprising:

a memory; and at least one processor coupled to the memory and configured for:

identifying each of one or more varying portions of a customized version of a program as compared to a standard version of the program;

identifying each of one or more common portions of the customized version of the program as compared to the standard version of the program;

merging the customized version of the program with the standard version of the program to create a merged version of the program based on the one or more identified common portions and the one or more identified varying portions such that semantics of both the customized version of the program and the standard version of the program are preserved in the merged program;

associating each change contributed by the customized version of the program, represented by the one or more identified varying portions in the merged version of the program, to a defined extension point in the merged version;

generating a program extension for the standard version of the program for each span of the program contained in a defined extension point span in the merged version; and visualizing each of multiple conflicting behavioral differences between the standard version of the program and the customized version of the program with a combination of a textual view and a graphical view, wherein each of the multiple conflicting behavioral differences represents an instance wherein corresponding individual behaviors of the standard version of the program and the customized version of the program interfere with each other so as to render the corresponding individual behaviors precluded.

18. A method comprising:

identifying each of one or more varying portions of a second version of a given code as compared to a first version of the given code via a web user interface executing on an enterprise resource planning device and in communication with a server;

merging the second version of the given code with the first version of the given code to create a merged version of the given code such that semantics of both the second version of the given code and the first version of the given code are preserved in the merged version of the given code, wherein said merging is carried out via the web user interface executing on the enterprise resource planning device;

resolving each interference created by the one or more identified varying portions in the merged version of the given code, wherein said resolving is carried out via the web user interface executing on the enterprise resource planning device;

associating each change contributed by the second version of the given code, represented by the one or more identified varying portions in the merged version of the given code, to a defined extension point in the merged version, wherein said associating is carried out via the web user interface executing on the enterprise resource planning device;

generating a program extension for the first version of the given code for each span of the given code contained in a defined extension point span in the merged version of the given cod; wherein said generating is carried out via the web user interface executing on the enterprise resource planning device; and visualizing each of multiple conflicting behavioral differences between the standard version of the program and the customized version of the program with a combination of a textual view and a graphical view, wherein each of the multiple conflicting behavioral differences represents an instance wherein corresponding individual behaviors of the standard version of the program and the customized version of the program interfere with each other so as to render the corresponding individual behaviors precluded, wherein said visualizing is carried out via the web user interface executing on the enterprise resource planning device.

* * * * *